Oct. 10, 1944.    M. F. SKINKER    2,359,801
RECTIFIER AND METHOD OF MAKING THE SAME
Filed July 22, 1943    2 Sheets-Sheet 1

INVENTOR.
MURRAY F. SKINKER
BY
ATTORNEY

Oct. 10, 1944.  M. F. SKINKER  2,359,801
RECTIFIER AND METHOD OF MAKING THE SAME
Filed July 22, 1943  2 Sheets-Sheet 2

INVENTOR.
MURRAY F. SKINKER
BY
ATTORNEY

Patented Oct. 10, 1944

2,359,801

UNITED STATES PATENT OFFICE 2,359,801

RECTIFIER AND METHOD OF MAKING THE SAME

Murray F. Skinker, Montclair, N. J., assignor to Federal Telephone and Radio Corporation, Newark, N. J., a corporation of Delaware Application July 22, 1943, Serial No. 495,673

12 Claims. (Cl. 175—366)

This invention relates to improvements in rectifiers and method of making the same, and more particularly to dry-contact rectifiers, such as selenium rectifiers.

An object of this invention is to produce a simple and easily made rectifier.

Another object of this invention is to produce a simple rectifier particularly adapted to handle low power, for example, for use with indicating and measuring instruments.

A further object of this invention is directed toward a low-power selenium rectifier constructed so as to have a high current density and a high rectifying efficiency.

An additional object of this invention is to provide a light-weight rectifier of simple and relatively few parts.

Still another object of this invention is to provide a simple and inexpensive method of making small instrument rectifiers.

Other objects will become apparent from the following description taken in connection with the attached drawings showing several illustrative embodiments of the invention, and wherein.

Figure 1:
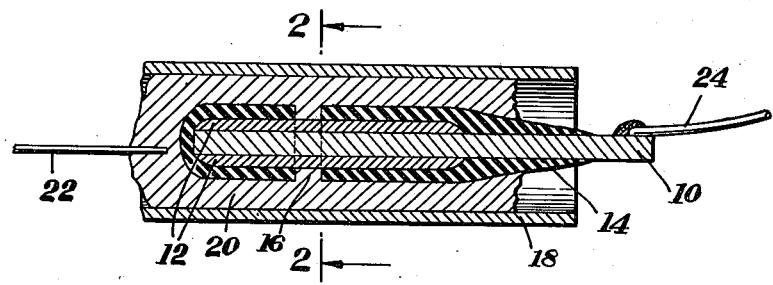
Fig. 1 is a longitudinal cross-sectional view of a preferred form of rectifier in accordance with the present invention.
Figure 2:
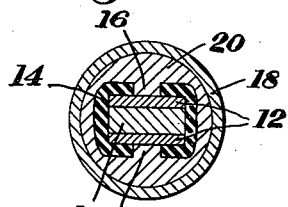
Fig. 2 is a transverse cross-sectional view taken along the line 2—2 of Fig. 1.
Figure 3:
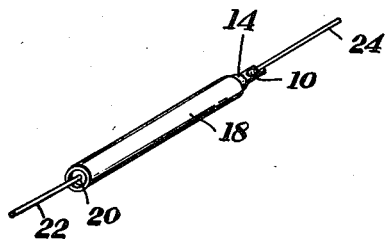
Fig. 3 is a perspective view of the rectifier illustrated in Figs. 1 and 2.

A preferred rectifier construction according to the present invention is illustrated in Figs. 1 and 2, while the appearance of this rectifier is more clearly shown in Fig. 3. The rectifier consists essentially of a metal base plate 10 on whose opposite flat sides is formed, in any manner known to the art, layers of selenium 12. Over the selenium layers and partially over the metal plate 10 is applied a layer of insulation 14 which may be any suitable material. In a preferred form of construction this may be a thin layer of varnish applied by dipping the selenium coated plate 10 into a suitable bath of varnish and permitting the latter to then dry over the plate and the selenium. The insulating layer 14 has one or more openings 16 extending therethrough to the selenium layer. If the insulation is applied by dipping the coated plate in a varnish bath, opposite openings 16 will be automatically formed if the coated plate is held by a clamp gripping the selenium in two spots. The clamp will thus automatically maintain two spots of selenium clean while also serving to hold the plate in the varnish.

After the base plate is coated with selenium and then varnished, in the manner described above, it is placed substantially centrally within a metal tube 18 and a soft alloy 20, preferably of the type usually used as a counter-electrode alloy is poured into the tube between the insulated plate and the inside of the tube itself. This alloy will penetrate the openings 16 to contact the selenium in a relatively small area spot, and when the alloy has cooled it will harden and be fused to the inside of the metal tube 18 thus holding the rectifier electrode in place. Before the alloy is hardened a lead wire 22 may be inserted therein, this lead wire thereby forming one terminal of the rectifier. A second lead wire 24 may be soldered or otherwise connected to the projecting end of the metal plate 10. The barrier layer between the selenium and the alloy may then be created by electroforming in the usual manner.

It will thus be seen that a small rectifier formed in accordance with the method and description outlined above fulfills the objects primarily stated. The rectifier is made up of simple and inexpensive parts and its assembly is extremely simple. As it is adapted to carry small currents, the small contact area between the counter-electrode alloy 20 and the selenium 12, as through the small openings 16 in this insulation 14, results in a high current density. This improves the efficiency of the rectifier since, as it is known to this art, the efficiency of a selenium rectifier increases with current density.

The various portions of the rectifier structure as shown in Figs. 1 and 2 have been exaggerated somewhat out of proportion to their preferred form for the sake of clarity. The plate 10 may be extremely thin, while this will also be true of the selenium layer 12. If a varnish insulation is used it will also be obvious that a thin layer of this varnish will have no appreciable thickness. Fig. 3 will provide a better indication of the relative proportioning of the parts and the general appearance of the rectifier as a whole. Fig. 3 is drawn to about three times the scale of rectifiers which have been made in accordance with the present disclosure, although it is to be clearly understood that as far as the principles of the present invention are concerned, no particular limitations as to size are contemplated.

In place of a rectangular metal base plate upon which the selenium layer is formed, as illustrated in Figs. 1, 2 and 3, it is also contemplated that a round wire could be used equally as well.

Figure 4:
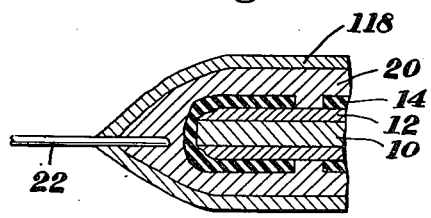
Fig. 4 is a partial, longitudinal cross-sectional view illustrating a modified detail of construction of the rectifier shown in Figs. 1, 2 and 3.

In order to assure a firmer clamping of the lead wire 22 and also to assist in retaining the counter-electrode alloy within the metal tube 18 when it is poured therein in its molten state, I may use a modified construction such as shown in Fig. 4 in which, prior to the action of the molten alloy 20, the tube 118 is crimped about the lead wire 22 substantially sealing one end of the tube. Obviously, the enclosing metal tube could also be made closed at one end with the lead wire 22 soldered to some point on the outer surface of the enclosing metal tube. Functionally, this construction is the substantial equivalent of that illustrated in Figs. 1 to 4 inclusive.

Figure 5:
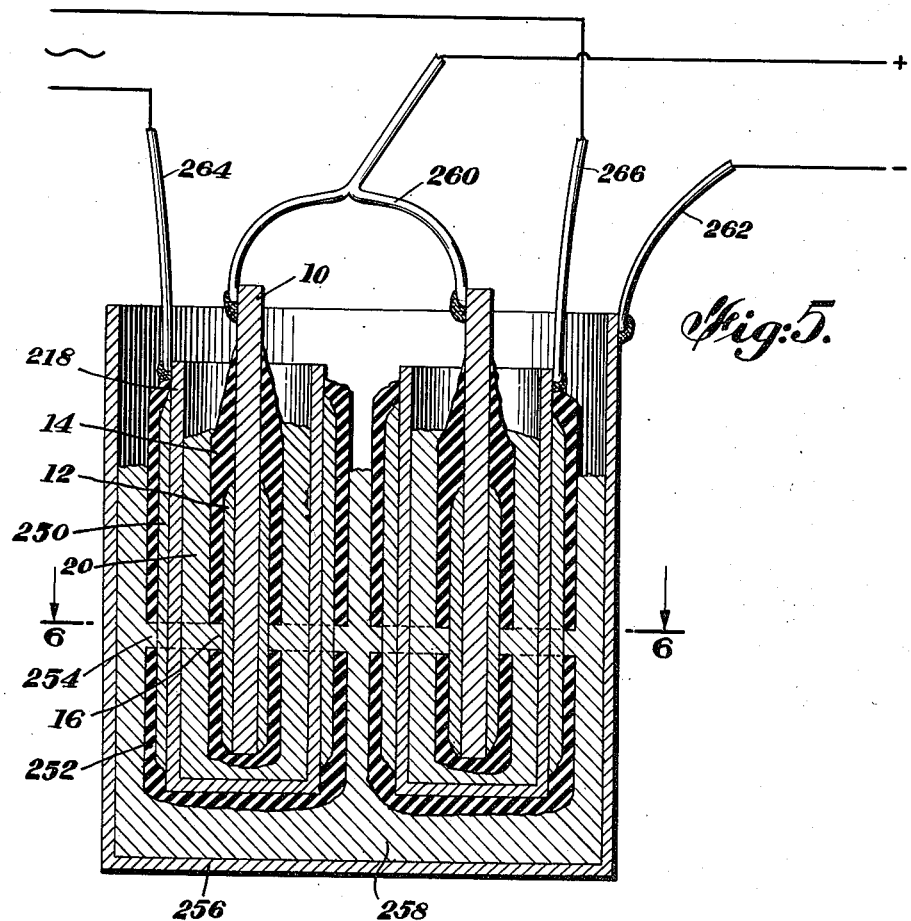
Fig. 5 is a longitudinal cross-sectional view of a full-wave bridge rectifier formed in accordance with the present invention.
Figure 6:
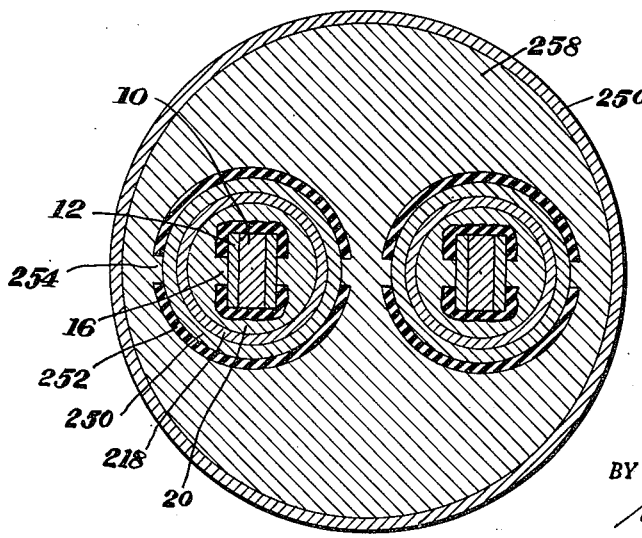
Fig. 6 is a horizontal cross-sectional view taken along the line 6—6 of Fig. 5.

The rectifier unit described above being of such small size, readily lends itself to the formation of a full-wave bridge rectifier assembly which still will be small and compact. A preferred form of such an assembly embodying rectifier units previously described is shown in Figs. 5 and 6. Two basic units each consisting of a base plate 10 covered by a selenium coating 12 and over which is placed insulation 14 having openings 16 therethrough are used. Each of these basic units is, in turn, placed within a metal tube 218 which, in this case, is preferably closed at one end. Counter-electrode alloy is melted between the insulation 14 and the inside of the tube 218, contacting the selenium layer through the openings 16, on the one hand and fusing with the inner surface of the tube 218 on the other hand. In the form of invention illustrated in Figs. 5 and 6, the tube 18 in addition to being closed at one end is also preferably made of a metal, for example, containing iron, which is suitable for use as the base plate of a second rectifier. This second rectifier is formed by placing a second layer of selenium 250 on the outer surface of the tube 218. The selenium layer 250 is, in turn, covered by suitable insulation, as by dipping it in lacquer, again leaving openings 254 through the insulation to the selenium layer itself. Two of the double rectifier units thus described are then placed within a metal container 256, also previously closed at one end, and additional counter-electrode alloy 258 is poured into this container between the insulating coating 252 and the inner walls of the container itself. This counter-electrode alloy will penetrate through the openings 254 to the selenium layers 250 on the one hand, and will be fused to the inside of the container 256 on the other hand. If, now, the two base plates 10 are connected with one another by a bridge connector 260, and leads are attached to the container 256 (or to the alloy 258), and to each of the containers 218 of the two rectifier units (or the respective counter-electrode alloys), as full-wave bridge rectifier of simple and small construction will result. For example, if alternating current is supplied to the individual rectifier unit containers, as through leads 264 and 266, direct current will appear across the lead 262 and the bridge connector 260, the positive terminal being taken off the bridge and the negative terminal off the lead 262.

Variations in details of the construction illustrated by way of example will occur to those skilled in this art. As previously pointed out, the proportions, particularly of the metal base plate, the selenium layer, and the insulation, have been exaggerated in Figs. 1, 2, 4, 5 and 6 for the sake of clarity. Instead of dipping the selenium coated based plate in varnish, other comparable insulating materials could be used and, in addition, in view of the low voltage and currents contemplated when these rectifiers are used in connection with instruments or indicators, paper insulation, for example, masking tape having pre-formed small holes could be applied instead. The size of the opening through the insulation will depend upon the current density desired for most efficient rectification and while holes on both sides of the plate have been indicated, thus in effect creating two small rectifiers in parallel in which case, one opening alone could be used if necessary.

While it is contemplated that the inside of the tube be filled with the counter-electrode alloy to simultaneously contact the selenium spots and fuse with the inside of the tube, it is also possible to merely place a small amount of alloy on the insulation and in the openings prior to the insertion of the metal plate within the metal tube, and then add additional alloy fusing with the first alloy and with the inside of the tube to hold the parts together. While this method involves an additional step in making the small rectifier unit, it also insures flow of the alloy into the openings and good contact with the selenium spot.

While I have described above the principles of my invention in connection with a specific device, and particular modifications thereof, it is to be clearly understood that this description is made only by way of example and not as a limitation on the scope of my invention as set forth in the objects and the accompanying claims.

I claim:

1. A rectifier unit comprising, in combination, a metal base, a layer of selenium on said base, a layer of insulating material having an opening therethrough covering said selenium layer except for said opening, a metal tube spaced from and surrounding said insulating layer, and counter-electrode alloy material intermediate said insulating layer and said tube, said alloy penetrating said opening to contact said selenium layer on the one hand and being fused to the inside of said metal tube on the other hand.

2. The combination according to claim 1, in which said metal base is a thin flat metal plate projecting uncovered from one end of the tube to serve as a rectifier terminal.

3. The combination according to claim 1, in combination with a lead wire extending into said metal tube and held in place by the hardened alloy.

4. The combination according to claim 1, in combination with a lead wire for said rectifier extending into one end of said metal tube, and in which said one end of the metal tube is crimped about said lead wire.

5. A rectifier unit comprising, in combination, a metal base plate, a layer of selenium on opposite faces of said plate, insulating material covering said selenium and extending about the sides of one end of said base plate, said insulating material having a pair of relatively small openings therein on opposite sides, extending to the respective selenium layers, a metal tube spaced from and surrounding said insulation, and a counter-electrode alloy fused intermediate said insulation and said tube and extending through said opposite openings to the selenium layers.

6. A full-wave bridge rectifier assembly, comprising two rectifier units, each consisting of a metal base member, a selenium layer on said base member, an insulating layer covering said selenium layer, said insulating layer having an opening therethrough extending to the selenium layer, a metal tube closed at one end and spaced from said surrounding insulating layer, counter-electrode alloy intermediate said insulating layer and said metal tube penetrating through said opening to said selenium layer and fused to the inside of the metal tube, a second selenium layer on the outer surface of said metal tube, and a second insulating layer having an opening therethrough covering said selenium layer and the closed end of said metal tube, a metal container closed at one end and surrounding both of said rectifier units, counter-electrode alloy melted in said container penetrating to the second selenium layer of each unit and fused to the inside of said metal container so that when cool, it holds said units in said container in an integral assembly and a bridge connector between the two metal base members.

7. A full-wave bridge rectifier assembly, comprising two rectifier units, each consisting of a metal base member, a selenium layer on said base member, an insulating layer covering said selenium layer, said insulating layer having an opening therethrough extending to the selenium layer, a metal tube closed at one end and spaced from said surrounding insulating layer, counter-electrode alloy intermediate said insulating layer and said metal tube penetrating through said opening to said selenium layer and fused to the inside of the metal tube, a second selenium layer on the outer surface of said metal tube, and a second insulating layer having an opening therethrough covering said selenium layer and the closed end of said metal tube, a metal container closed at one end and surrounding both of said rectifier units, counter-electrode alloy melted in said container penetrating to the second selenium layer of each unit and fused to the inside of said metal container so that when cool, it holds said units in said container in an integral assembly, a bridge connector between the two metal base members, and leads respectively electrically connected to the counter-electrode alloy of each rectifier unit, the counter-electrode alloy within the metal container and to the common bridge connector between the metal base members.

8. The combination according to claim 7, in which the leads attached to the counter-electrode alloy of each rectifier unit are attached to the respective metal tubes and in which the lead connected to the counter-electrode alloy within the metal container is attached to the container itself.

9. The method of making a rectifier unit which includes the steps of coating a metal base with selenium, gripping the selenium-coated base at two spots and dipping it into a liquid insulant, whereby when the insulant dries, two clean selenium spots will be exposed, placing the insulated-coated metal base into a metal tube and melting a counter-electrode alloy between the insulating base and the metal tube, whereby said alloy penetrates to the selenium layer through the openings in said insulation, and upon cooling fuses with the inside of the metal tube and holds all of the parts in place to form an integral rectifier structure.

10. The method according to claim 9, which includes a further step of inserting a lead wire into the molten alloy to form a permanent rectifier lead when the alloy cools.

11. The method according to claim 9, which includes the further step of inserting a lead wire into the metal tube prior to insertion of the alloy, and crimping the end of the tube about this lead wire.

12. The method of making a rectifier unit which includes the steps of coating a metal base with selenium, covering the selenium coated base with insulation, leaving one small opening through the insulation leading to the selenium layer, placing the insulated coated metal base in a metal tube, and melting a counter-electrode alloy between the insulated base and the metal tube, whereby said alloy penetrates to the selenium layer through the opening in the insulation and, upon cooling fuses with the inside of the metal tube to hold all the parts in place to form an integral rectifier structure.

MURRAY F. SKINKER.